United States Patent
Cheng et al.

(10) Patent No.: US 12,382,524 B2
(45) Date of Patent: Aug. 5, 2025

(54) RADIO (NR) EARLY MEASUREMENT WITH MULTIPLE SECONDARY NODES (MULTI-SNS)

(71) Applicant: QUALCOMM Incorporated, San Diego, CA (US)

(72) Inventors: Peng Cheng, Beijing (CN); Karthika Paladugu, San Diego, CA (US); Gavin Bernard Horn, La Jolla, CA (US); Punyaslok Purkayastha, San Diego, CA (US); Masato Kitazoe, Tokyo (JP); Ozcan Ozturk, San Diego, CA (US); Huichun Liu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 467 days.

(21) Appl. No.: 17/597,771

(22) PCT Filed: Aug. 15, 2019

(86) PCT No.: PCT/CN2019/100724
§ 371 (c)(1),
(2) Date: Jan. 21, 2022

(87) PCT Pub. No.: WO2021/026862
PCT Pub. Date: Feb. 18, 2021

(65) Prior Publication Data
US 2022/0279613 A1  Sep. 1, 2022

(51) Int. Cl.
*H04W 76/15* (2018.01)
*H04W 24/10* (2009.01)
(Continued)

(52) U.S. Cl.
CPC .......... *H04W 76/15* (2018.02); *H04W 24/10* (2013.01); *H04W 74/0833* (2013.01);
(Continued)

(58) Field of Classification Search
CPC . H04W 76/15; H04W 24/10; H04W 74/0833; H04W 76/19; H04W 76/20;
(Continued)

(56) References Cited

U.S. PATENT DOCUMENTS

| | | | |
|---|---|---|---|
| 2014/0022925 A1* | 1/2014 | Cili | H04L 25/0222 370/252 |
| 2016/0057800 A1* | 2/2016 | Ingale | H04L 5/0032 370/216 |

(Continued)

FOREIGN PATENT DOCUMENTS

| | | |
|---|---|---|
| CN | 104349505 A | 2/2015 |
| CN | 104936163 A | 9/2015 |

(Continued)

OTHER PUBLICATIONS

CATT: "Available Cell (Re)selection Measurement Result Reporting", 3GPP TSG-RAN WG2 Meeting #106, R2-1905877 Revision of R2-1903318, 3rd Generation Partnership Project, Mobile Competence Centre, 650, Route Des Lucioles, F-06921 Sophia-Antipolis Cedex, France, vol. RAN WG2, No. Reno, Nevada, USA, May 13, 2019-May 17, 2019, May 13, 2019, 4 Pages, XP051729372, figures 1, 2.

(Continued)

*Primary Examiner* — Kibrom T Hailu
(74) *Attorney, Agent, or Firm* — Harrity & Harrity, LLP

(57) ABSTRACT

This disclosure provides systems, methods and apparatuses for early measurement associated with configuring with multiple secondary nodes (SNs). In one aspect, the configuration of multiple SNs may be improved by allowing a master node (MN) to determine a multi-SN configuration based at least in part on measurements of actual channel conditions as seen by the UE. Enabling the MN to receive the measurement information early during a process associated with establishing a connection between the UE and (Continued)

the MN may thereby improve efficiency and reduce latency associated with the configuration of multiple SNs.

29 Claims, 10 Drawing Sheets

(51) Int. Cl.
*H04W 74/0833* (2024.01)
*H04W 76/19* (2018.01)
*H04W 76/20* (2018.01)
*H04W 76/30* (2018.01)

(52) U.S. Cl.
CPC .......... *H04W 76/19* (2018.02); *H04W 76/20* (2018.02); *H04W 76/30* (2018.02)

(58) Field of Classification Search
CPC ... H04W 76/30; H04W 36/362; H04W 76/34; H04W 48/16; H04W 76/27
See application file for complete search history.

(56) References Cited

U.S. PATENT DOCUMENTS

| | | | |
|---|---|---|---|
| 2016/0219475 A1 | 7/2016 | Kim | |
| 2017/0055187 A1* | 2/2017 | Kang | H04W 36/0069 |
| 2018/0270686 A1* | 9/2018 | Bergström | H04W 72/56 |
| 2019/0028348 A1* | 1/2019 | Chai | H04L 1/0026 |
| 2019/0261235 A1* | 8/2019 | Yilmaz | H04W 36/32 |
| 2019/0380087 A1* | 12/2019 | Park | H04W 72/29 |
| 2020/0128601 A1* | 4/2020 | Willars | H04W 72/27 |
| 2020/0221503 A1* | 7/2020 | Kusashima | H04W 74/0833 |
| 2020/0245184 A1* | 7/2020 | Jin | H04W 28/22 |
| 2021/0092787 A1* | 3/2021 | Bergström | H04L 5/0098 |
| 2021/0120475 A1* | 4/2021 | Yang | H04W 36/0069 |
| 2021/0337414 A1* | 10/2021 | Yilmaz | H04W 40/02 |
| 2022/0116803 A1* | 4/2022 | Yan | H04W 76/27 |
| 2022/0132607 A1* | 4/2022 | Yilmaz | H04W 68/02 |

FOREIGN PATENT DOCUMENTS

| | | |
|---|---|---|
| CN | 106559916 A | 4/2017 |
| WO | WO-2019140620 A1 | 7/2019 |

OTHER PUBLICATIONS

Email Discussion Rapporteur (ZTE): "Procedures and MgsB Content [105bis#30] [NR/2-step RACH]", 3GPP TSG-WG2 Meeting #106, R2-1906308, 3rd Generation Partnership Project, Mobile Competence Centre, 650, Route Des Lucioles, F-06921 Sophia-Antipolis Cedex, France, vol. TSG-WG2, Reno, USA, May 13, 2019-May 17, 2019, pp. 1-91, May 13, 2019, XP051710625, pp. 10,11.

Huawei et al., "Fast SN Addition and SCell Activation via Early Measurement Reporting", 3GPP TSG-RAN WG2 ##106, R2-1907486 (revision of R2-1905169), 3rd Generation Partnership Project, Mobile Competence Centre, 650, Route Des Lucioles, F-06921 Sophia-Antipolis Cedex, France, vol. RAN WG2, No. Reno, USA, May 13, 2019-May 17, 2019, May 3, 2019, 3 Pages, XP051711768, section 2.

Supplementary European Search Report—EP19941769—Search Authority—Munich—Apr. 13, 2023.

International Search Report and Written Opinion—PCT/CN2019/100724—ISA/EPO—May 14, 2020.

LG Electronics., "RAN 1 Issues for Support of Dual Connectivity with Small Cell", 3GPP TSG RAN WGl #73, R1-132240, May 24, 2013 (May 24, 2013) the whole document, 5 pages.

* cited by examiner

RADIO (NR) EARLY MEASUREMENT WITH MULTIPLE SECONDARY NODES (MULTI-SNS)

CROSS-REFERENCE TO RELATED APPLICATION

This application is a 371 national stage of PCT Application No. PCT/CN2019/100724 filed on Aug. 15, 2019, entitled "NEW RADIO (NR) EARLY MEASUREMENT WITH MULTIPLE SECONDARY NODES (MULTI-SNs)," which is hereby expressly incorporated by reference herein.

TECHNICAL FIELD

Aspects of the present disclosure relate generally to wireless communication, and more particularly to techniques for New Radio (NR) early measurement with multiple secondary nodes (multi-SNs).

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, or a 5G NodeB.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency-division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by a user equipment (UE). The method may include performing a plurality of measurements associated with a plurality of secondary nodes (SNs) that are candidates to provide dual connectivity with a master node (MN); and providing, to the MN, measurement information associated with a subset of SNs of the plurality of SNs, based at least in part on performing the plurality of measurements.

In some aspects the plurality of measurements is performed based at least in part on a measurement configuration associated with the plurality of SNs. In some aspects, the measurement configuration includes mapping information associating each of the plurality of SNs with a respective SN identifier of a plurality of SN identifiers. In some aspects, the measurement configuration includes information that identifies a cell quality threshold associated with selecting the subset of SNs from the plurality of SNs. In some aspects, the measurement configuration is received in a radio resource control (RRC) release message provided by the MN.

In some aspects, the method can include selecting the subset of SNs from the plurality of SNs based at least in part on a cell quality threshold.

In some aspects, the measurement information is provided based at least in part on a request received by the UE. In some aspects, the request is received in an RRC resume message provided by the MN.

In some aspects, the measurement information is provided in an RRC resume complete message.

In some aspects, the measurement information is provided in an RRC resume request message.

In some aspects, the measurement information includes measurement reports associated with the subset of SNs.

In some aspects, the measurement information includes a subset of SN identifiers, each identifying one SN in the subset of SNs.

In some aspects, the measurement information includes a temporary mobile subscriber identity (TMSI) associated with the UE in an RRC idle mode state.

In some aspects, the method can include receiving a multi-SN configuration after providing the measurement information, where the multi-SN configuration includes a configuration for at least two SNs in the subset of SNs. In some aspects, the multi-SN configuration is received in an RRC reconfiguration message. In some aspects, the multi-SN configuration is received in an RRC resume message.

In some aspects, the UE is in an RRC idle mode.

In some aspects, the UE is in an RRC inactive mode.

In some aspects, the UE is performing a four-step random access (RACH) procedure.

In some aspects, the UE is performing a two-step RACH procedure.

Another innovative aspect of the subject matter described in this disclosure can be implemented in a UE for wireless communication. The UE may include memory and one or more processors operatively coupled to the memory. The memory and the one or more processors may be configured to perform a plurality of measurements associated with a plurality of SNs that are candidates to provide dual connectivity with a MN; and provide, to the MN, measurement information associated with a subset of SNs of the plurality of SNs, based at least in part on performing the plurality of measurements.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to perform a plurality of measurements associated with a plurality of SNs that are candidates to provide dual connectivity with a MN; and provide, to the MN, measurement information associated with a subset of SNs of the plurality of SNs, based at least in part on performing the plurality of measurements.

Another innovative aspect of the subject matter described in this disclosure can be implemented in an apparatus for wireless communication. The apparatus may include means for performing a plurality of measurements associated with a plurality of SNs that are candidates to provide dual connectivity with a MN; and means for providing, to the MN, measurement information associated with a subset of SNs of the plurality of SNs, based at least in part on performing the plurality of measurements.

Another innovative aspect of the subject matter described in this disclosure can be implemented in a method of wireless communication performed by a master node (MN). The method may include receiving, from a UE, measurement information associated with a subset of SNs of a plurality of SNs that are candidates to provide dual connectivity with the MN; and providing a multi-SN configuration based at least in part on the measurement information, where the multi-SN configuration includes a configuration for at least two SNs in the subset of SNs.

In some implementations, the method can include providing a measurement configuration associated with the plurality of SNs, where the measurement information is received after providing the measurement configuration. In some aspects, the measurement configuration includes mapping information associating each of the plurality of SNs with a respective SN identifier of a plurality of SN identifiers. In some aspects, the measurement configuration includes information that identifies a cell quality threshold associated with selecting the subset of SNs from the plurality of SNs. In some aspects, the measurement configuration is provided in a radio resource control (RRC) release message provided by the MN.

In some aspects, the measurement information is received based at least in part on a request provided by the MN. In some aspects, the request is provided in an RRC resume message to the UE.

In some aspects, the measurement information is received in an RRC resume complete message.

In some aspects, the measurement information is received in RRC resume request message.

In some aspects, the measurement information includes measurement reports associated with the subset of SNs.

In some aspects, the measurement information includes a subset of SN identifiers, each identifying one SN in the subset of SNs.

In some aspects, the measurement information includes a TMSI associated with the UE in an RRC idle mode state.

In some aspects, the multi-SN configuration is provided in an RRC reconfiguration message.

In some aspects, the multi-SN configuration is provided in an RRC resume message.

In some aspects, the UE is in an RRC idle mode.

In some aspects, the UE is in an RRC inactive mode.

In some aspects, the UE is performing a four-step random access (RACH) procedure.

In some aspects, the UE is performing a two-step RACH procedure.

Another innovative aspect of the subject matter described in this disclosure can be implemented in an MN for wireless communication. The MN may include memory and one or more processors operatively coupled to the memory. The memory and the one or more processors may be configured to receive, from a UE, measurement information associated with a subset of SNs of a plurality of SNs that are candidates to provide dual connectivity with the MN; and provide a multi-SN configuration based at least in part on the measurement information, where the multi-SN configuration includes a configuration for at least two SNs in the subset of SNs.

Another innovative aspect of the subject matter described in this disclosure can be implemented in a non-transitory computer-readable medium. The non-transitory computer-readable medium may store one or more instructions for wireless communication. The one or more instructions, when executed by one or more processors of an MN, may cause the one or more processors to receive, from a UE, measurement information associated with a subset of SNs of a plurality of SNs that are candidates to provide dual connectivity with the MN; and provide a multi-SN configuration based at least in part on the measurement information, where the multi-SN configuration includes a configuration for at least two SNs in the subset of SNs.

Another innovative aspect of the subject matter described in this disclosure can be implemented in an apparatus for wireless communication. The apparatus may include means for receiving, from a UE, measurement information associated with a subset of SNs of a plurality of SNs that are candidates to provide dual connectivity with the MN; and means for providing a multi-SN configuration based at least in part on the measurement information, where the multi-SN configuration includes a configuration for at least two SNs in the subset of SNs.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
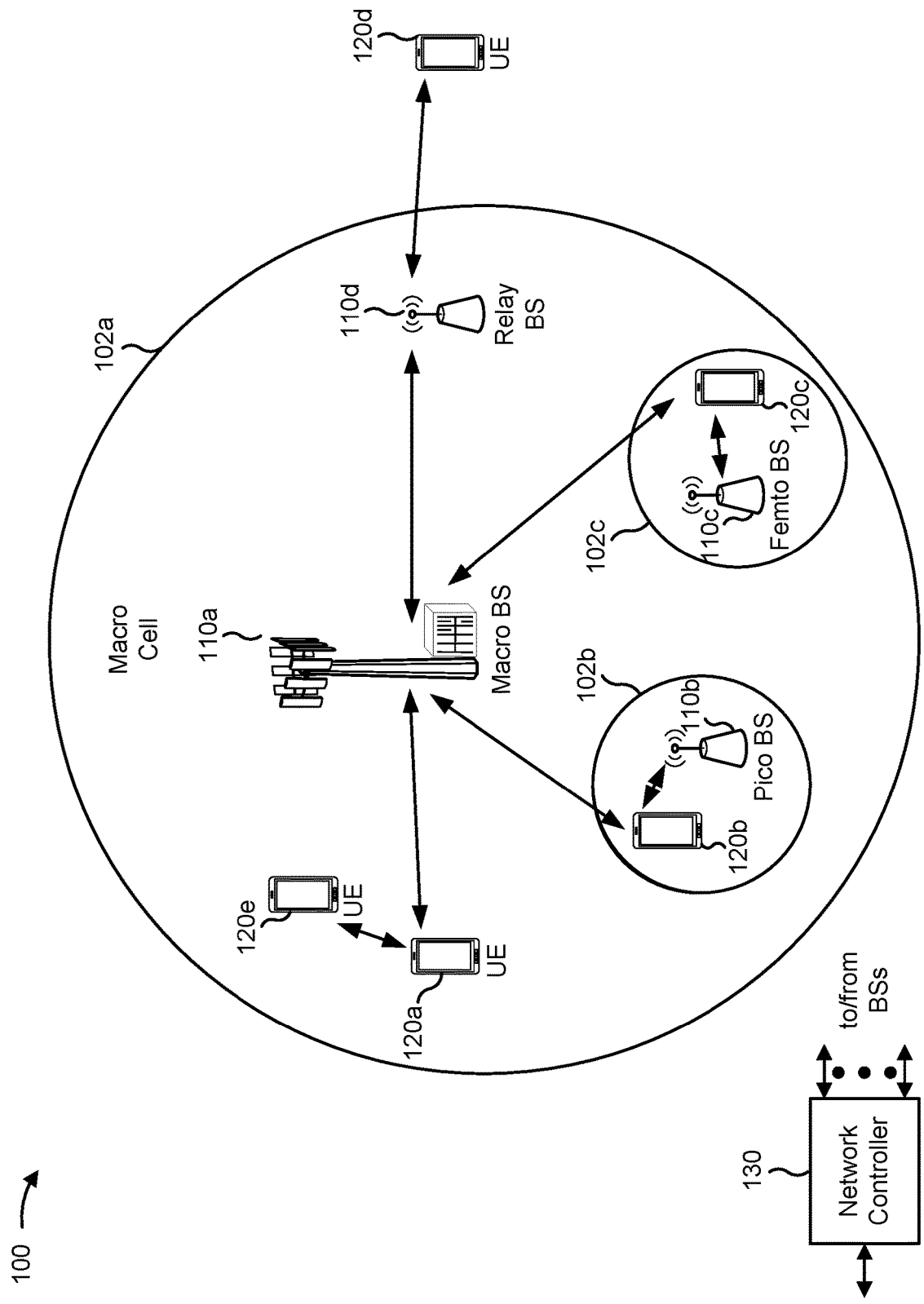
FIG. 1 is a block diagram conceptually illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Some wireless communication systems permit dual connectivity of a user equipment (UE) to a network. For example, with dual connectivity, the UE may connect to the network via a master cell group (MCG), which may include one or more serving cells associated with a master node (MN), and a secondary cell group (SCG), which may include one or more serving cells associated with a secondary node (SN). Dual connectivity via the MN and the SN may enable improved connectivity, coverage area, and bandwidth for the UE. However, in dual connectivity, the UE may switch between SNs (for example, as the UE moves throughout a coverage area of the MN). In some wireless communication systems, switching between SNs involves releasing a current SN being used for the dual connectivity and adding, according to an addition procedure, a new SN that is to be used for the dual connectivity. In some implementations, this addition procedure may be inefficient and cause substantial latency of dual connectivity communications. Moreover, this inefficiency may be exacerbated in communications in a millimeter wave (mmW) band, where frequent SN switching is common due to fluctuating channel quality.

To address these issues, a procedure for configuring multiple SNs for dual connectivity with an MN may be implemented in some wireless communication systems. In such wireless communication systems, the MN may provide, to the UE, a configuration for the multiple SNs (herein referred to as a multi-SN configuration). The UE may store the multi-SN configuration during dual connectivity communications with the MN, and the multi-SN configuration may be used to facilitate efficient low latency switching between the multiple SNs.

To determine an appropriate multi-SN configuration (i.e., to identify SNs to be included in the multi-SN configuration), the MN may utilize measurement information from the UE, where the measurement information includes information associated with measurements (such as channel condition measurements) performed by the UE for a pool of candidate SNs for providing dual connectivity with the MN. With such measurement information, the MN may determine the multi-SN configuration based on actual measurements performed by the UE. To further improve efficiency associated with multi-SN configuration, it is advantageous for the UE to provide the measurement information as early as possible during a procedure associated with establishing a connection between the UE and the MN. Some aspects described herein provide techniques and apparatuses for early measurement with multi-SN.

Particular implementations of the subject matter described in this disclosure can be implemented to realize one or more of the following potential advantages. In some aspects, the techniques and apparatus described herein improve the configuration of multiple SNs by allowing the MN to determine a multi-SN configuration based at least in part on measurements of actual channel conditions as seen by the UE. The techniques and apparatuses described herein provide the further advantage of enabling the MN to receive the measurement information early during a process associated with establishing a connection between the UE and the MN, thereby improving efficiency and reducing latency associated with the configuration of multiple SNs.

FIG. 1 is a block diagram conceptually illustrating an example of a wireless network 100. The wireless network 100 may be an LTE network or some other wireless network, such as a 5G or NR network. Wireless network 100 may include a number of BSs 110 (shown as BS 110*a*, BS 110*b*, BS 110*c*, and BS 110*d*) and other network entities. A BS is an entity that communicates with user equipment (UEs) and also may be referred to as a base station, a NR BS, a Node B, a gNB, a 5G node B (NB), an access point, or a transmit receive point (TRP). Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (for example, three) cells. The terms "eNB", "base station", "NR BS", "g B", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

Wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station also may be referred to as a relay BS, a relay base station, a relay, etc.

Wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. Network controller 130 may communicate with the BSs via a backhaul. The BSs also may communicate with one another, for example, directly or indirectly via a wireless or wireline backhaul.

UEs 120 (for example, 120*a*, 120*b*, 120*c*) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 120 may be included inside a housing that houses components of UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Figure 2:
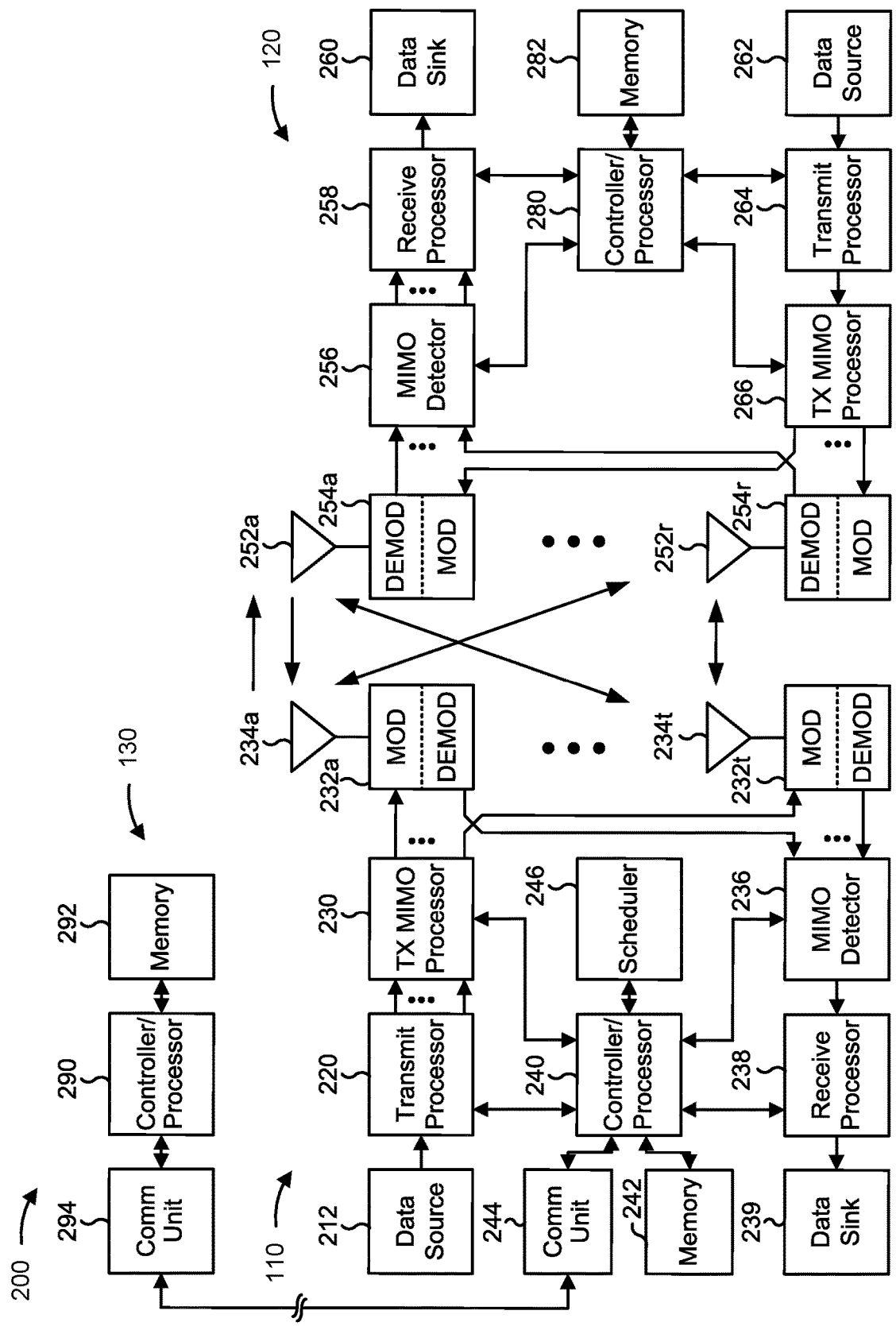
FIG. 2 is a block diagram conceptually illustrating an example of a base station (BS) in communication with a user equipment (UE) in a wireless network.

FIG. 2 is a block diagram conceptually illustrating an example 200 of a base station 110 in communication with a UE 120. In some aspects, base station 110 and UE 120 may respectively be one of the base stations and one of the UEs in wireless network 100 of FIG. 1. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by modulators 254a through 254r (for example, for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The base station 110 may include communication unit 244 and communicate to network controller 130 via communication unit 244. The network controller 130 may include communication unit 294, a controller or processor (i.e., controller/processor) 290, and memory 292.

The controller/processor 240 of base station 110, the controller/processor 280 of UE 120, or any other component(s) of FIG. 2 may perform one or more techniques associated with NR early measurement for multi-SN, as described in more detail elsewhere herein. For example, the controller/processor 240 of base station 110, the controller/processor 280 of UE 120, or any other component(s) (or combinations of components) of FIG. 2 may perform or direct operations of, for example, process 500 of FIG. 5, process 600 of FIG. 6, or other processes as described herein. The memories 242 and 282 may store data and program codes for base station 110 and UE 120, respectively. A scheduler 246 may schedule UEs for data transmission on the downlink, the uplink, or a combination thereof.

Figure 5:
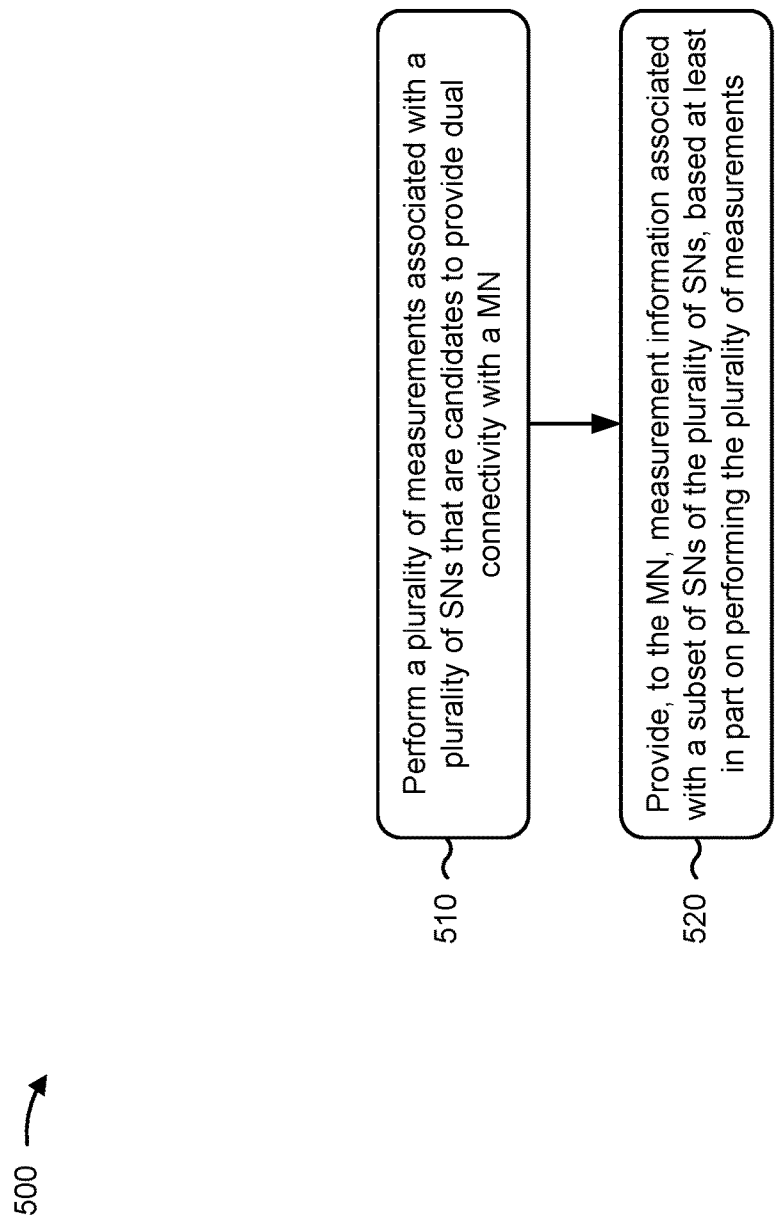
FIG. 5 is a diagram illustrating an example process performed, for example, by a UE.

The stored program codes, when executed by the controller/processor 280 or other processors and modules at UE 120, may cause the UE 120 to perform operations described with respect to process 500 of FIG. 5 or other processes as described herein. The stored program codes, when executed by the controller/processor 240 or other processors and modules at base station 110, may cause the base station 110 to perform operations described with respect to process 600 of FIG. 6 or other processes as described herein. A scheduler 246 may schedule UEs for data transmission on the downlink, the uplink, or a combination thereof.

The UE 120 may include means for performing one or more operations described herein, such as the process 500 of FIG. 5 or other processes as described herein. In some aspects, such means may include one or more components of UE 120 described in connection with FIG. 2.

Figure 6:
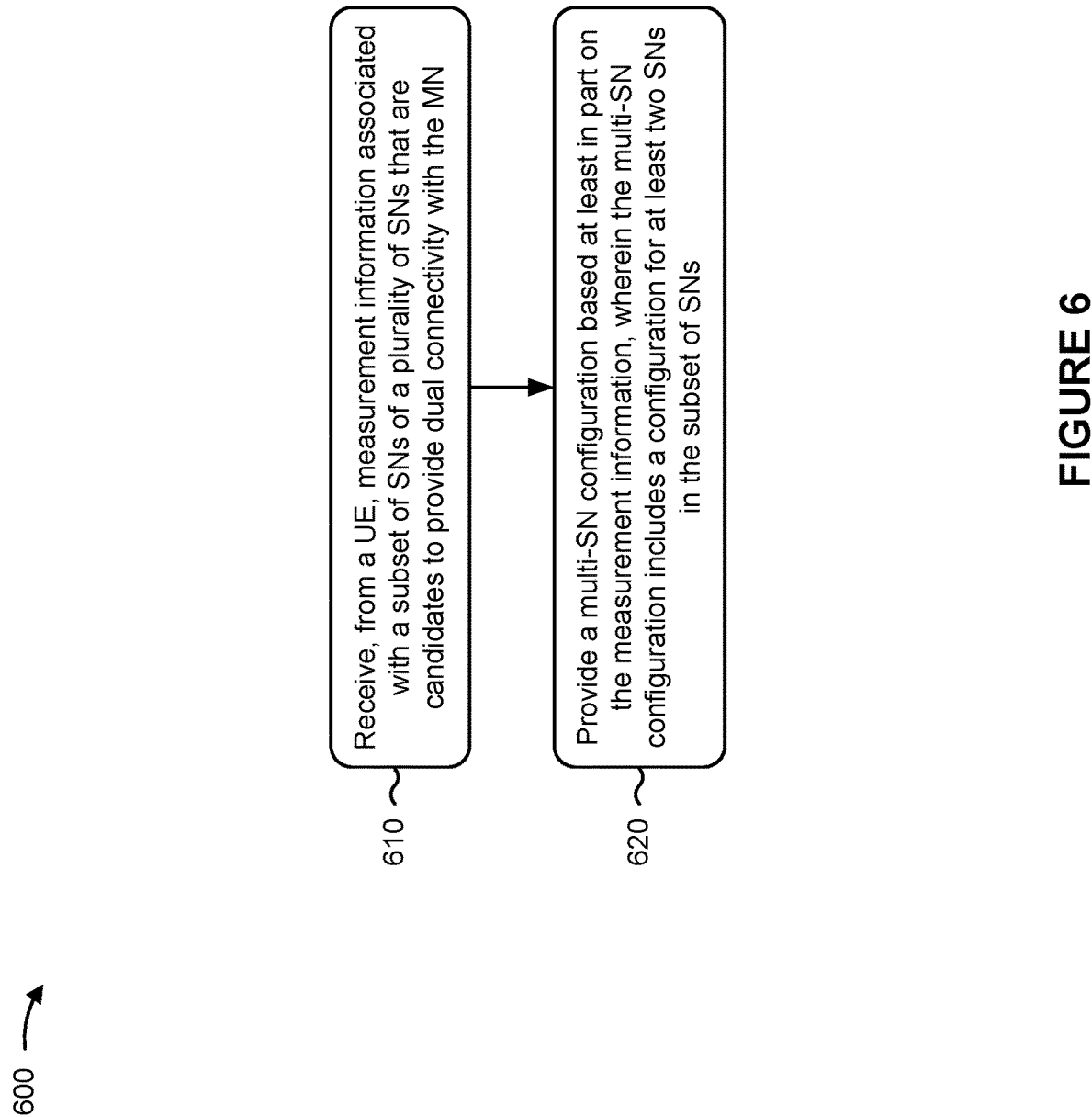
FIG. 6 is a diagram illustrating an example process performed, for example, by a BS.

The base station 110 may include means for performing one or more operations described herein, such as the process 600 of FIG. 6 or other processes as described herein. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
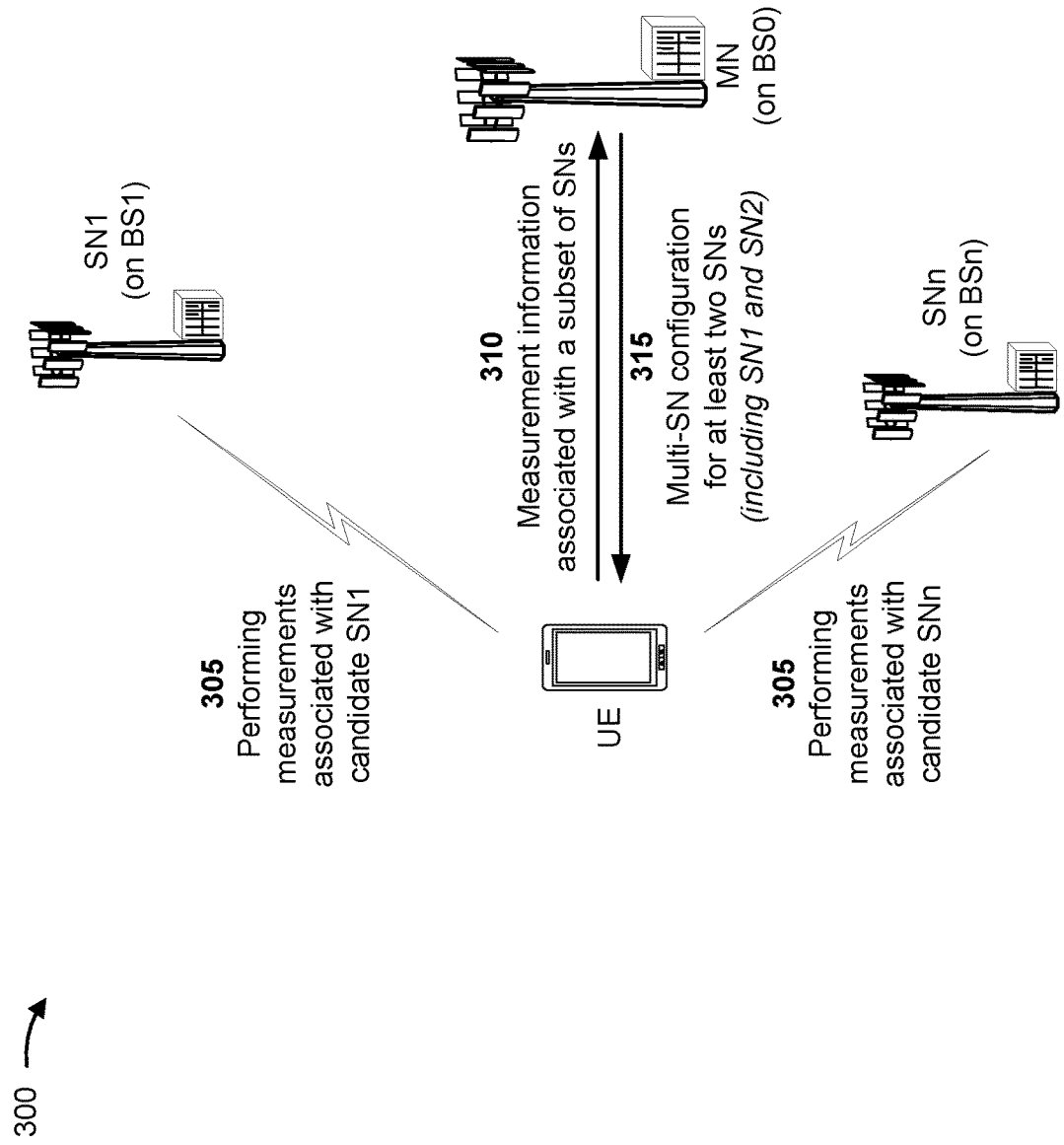
FIGS. 3 and 4A-4E are diagrams illustrating examples associated with early measurement with multiple secondary nodes (multi-SN).

FIG. 3 is a diagram illustrating an example 300 associated with early measurement with multi-SN. In the example shown in FIG. 3, an MN is configured on a first base station (such as a first base station 110 identified in FIG. 3 as BS0), while a first candidate SN (such as identified in FIG. 3 as SN1), is configured on a second base station (such as a second base station 110 identified in FIG. 3 as BS1), and a second candidate SN (such as identified in FIG. 3 as SNn (n>1)) is configured on a third base station (such as a third base station 110 identified in FIG. 3 as BSn). Notably, the example 300 is provided for illustrative purposes, and the configuration of SNs may be different from that shown in FIG. 3. For example, in some cases, one or more SNs may be configured on a same base station as another SN or on a same base station as the MN.

As shown in FIG. 3 by reference number 305, a UE (such as a UE 120) may perform measurements associated with multiple SNs that are candidates to provide dual connectivity with a MN. For example, as shown in FIG. 3, the UE may perform one or more measurements associated with one or more frequencies of the first candidate SN and one or more measurements associated with one or more frequencies of the second candidate SN. In some aspects, the one or more measurements associated with a given candidate SN may include a layer 3 measurement for a frequency associated with the SN.

In some aspects, the UE may perform the measurements based at least in part on a measurement configuration associated with the multiple SNs. The measurement configuration may include, for example, information identifying the multiple SNs, information that identifies a set of frequencies associated with each of the multiple SNs (such as information that identifies one or more frequencies for which measurements are to be performed), or another type of information based at least in part on which the UE may perform a measurement associated with the SN.

In some aspects, the measurement configuration measurement may include mapping information associating each of the multiple SNs with a respective SN identifier of multiple SN identifiers. In some aspects, as described below, the UE may provide measurement information including a subset of the multiple SN identifiers corresponding to a subset of the multiple SNs (such as rather than providing measurement reports associated with the subset of SNs).

In some aspects, the measurement configuration may include information that identifies a cell quality threshold associated with selecting a subset of SNs from the multiple SNs. An example of UE selection of a subset of the multiple SNs is provided below.

In some aspects, the UE may receive the measurement configuration from the MN. For example, the MN may provide the measurement in a radio resource control (RRC) release message (such as when the UE is entering an RRC idle mode or an RRC inactive mode) and the UE may receive the measurement configuration in the RRC release message.

As shown by reference number 310 in FIG. 3, the UE may provide, to the MN, measurement information associated with a subset of SNs of the multiple SNs, based at least in part on performing the measurements. In some aspects, the UE may perform the following operations while operating in a radio resource control (RRC) idle mode or in an RRC inactive mode. Further, in some aspects, the UE may the following operations as part of a four-step random access (RACH) procedure a two-step RACH procedure.

In some aspects, the UE may select the subset of SNs from the multiple SNs based at least in part on a cell quality threshold. For example, as described above, the measurement configuration may include a cell quality threshold that identifies a minimum cell quality for a candidate SN to be configured as an SN for the UE. Here, the UE may perform the measurements associated with the multiple SNs, as described above. The UE may then identify a subset of the multiple SNs for which a cell quality satisfies the cell quality threshold, and may select this subset of SNs as the subset of SNs for which the UE provides measurement information.

In some aspects, the measurement information may include a subset of multiple SN identifiers included in the measurement configuration. Here, each of the subset of SN identifiers may be associated with one of the selected subset of SNs. In such a case, the UE may be configured not to provide measurement reports associated with the subset of SNs, which reduces resource usage and improves security (such as since only the SN identifier needs to be provided in the measurement information, rather than specific information regarding a given SN).

In some aspects, the subset of SNs may include each of the multiple SNs. For example, the UE may be configured to select the subset of SNs to include each of the multiple SNs (such as such that the UE provides measurement information associated with each of the multiple SNs, without regard to cell quality).

In some aspects, the measurement information may include measurement reports associated with the subset of SNs. For example, the UE may select the subset of SNs in any manner described above, and may provide measurement information that includes a measurement report for each of the subset of SNs.

In some aspects, the measurement information may include a temporary mobile subscriber identity (TMSI) associated with the UE. For example, when the UE is in an RRC idle mode state, the UE may include a TMSI associated with the UE in the measurement information (such as such that the MN can determine previously configured mapping information, associated with the multiple SNs, that is stored by the MN).

In some aspects, the UE may provide the measurement information based at least in part on a request received from the MN. For example, in a network-based solution associated with early reporting for multi-SN, the MN may provide, to the UE, a request for the measurement information. In some aspects, the MN may provide such a request to the UE in, for example, an RRC resume message. An example of a network-based solution associated with early reporting for multi-SN is provided below in FIG. 4A.

In some aspects, the UE may automatically provide the measurement information (without a request from the MN). For example, in a UE-based solution associated with early reporting for multi-SN, the UE may automatically provide the measurement information without a request from the MN. Examples of various UE-based solutions associated with early reporting for multi-SN are provided below in FIGS. 4B-4E.

In some aspects, the UE may provide, and the MN may receive, the measurement information in an RRC resume complete message or in an RRC resume request message.

As shown by reference number 315 in FIG. 3, after the UE provides the measurement information, the MN may provide, and the UE may receive, a multi-SN configuration. For example, the MN may receive the measurement, and may determine a multi-SN configuration for the UE based at least in part on the measurement information. In some aspects, the multi-SN configuration may include a configuration for at least two SNs in the subset of SNs.

In some aspects, the MN may provide, and the UE may receive, the multi-SN configuration in an RRC reconfiguration message. In some aspects, the MN may provide, and the UE may receive, the multi-SN configuration in an RRC resume message.

FIGS. 4A-4E are diagrams illustrating particular examples associated with early measurement with multi-SN.

Figure 4A:
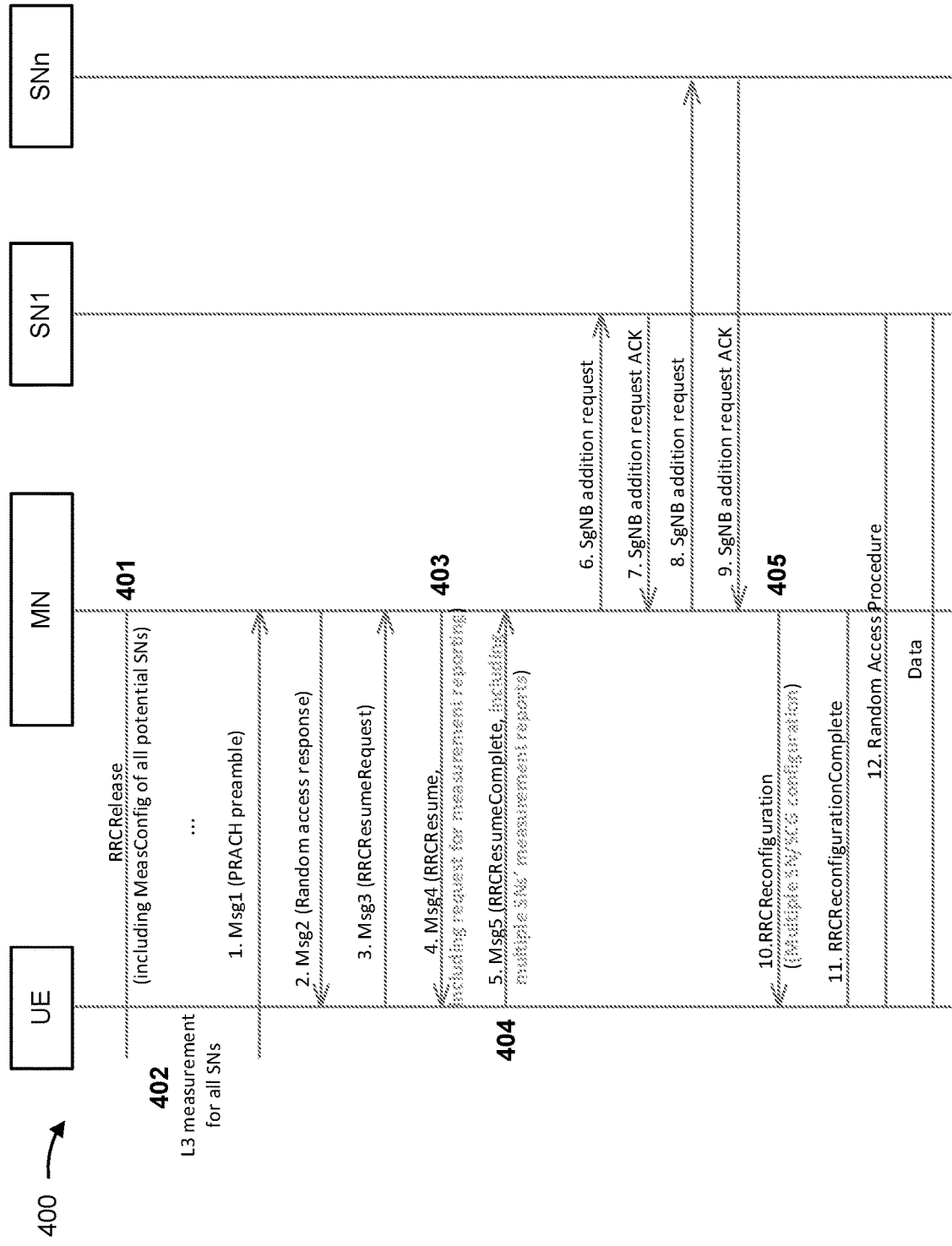

FIG. 4A is a diagram of an example 400 of a network-based solution associated with early reporting for multi-SN. As shown by reference number 401, the MN may provide (such as when the UE is entering an RRC idle mode or an RRC inactive mode), an RRC release message that includes a measurement configuration associated with multiple SNs that are candidates to provide dual connectivity with the MN.

As shown by reference number 402, the UE may perform measurements associated with the multiple SNs based at least in part on the measurement configuration received in the RRC release message.

As shown by reference number 403, when the UE is reestablishing a connection with the MN (such as at a later time) the UE may receive an RRC resume message (such as Msg4) provided by the MN during a procedure associated with reestablishing a connection with the MN (such as a four-step RACH procedure is shown as an example in FIG. 4A). As shown, the RRC resume message may include a request for measurement information associated with the multiple SNs.

As shown by reference number 404, based at least in part on the request, the UE may provide an RRC resume complete message (such as Msg5) including the measurement information. As shown, in this example, the measurement information includes measurement reports associated with (each of) the multiple SNs.

As shown by reference number 405, after addition of the multiple SNs by the MN, the MN may provide, and the UE may receive, a multi-SN configuration including a configuration for at least two SNs of the multiple SNs. As shown, the multi-SN configuration may be included in an RRC reconfiguration message provided by the MN.

Figure 4B:
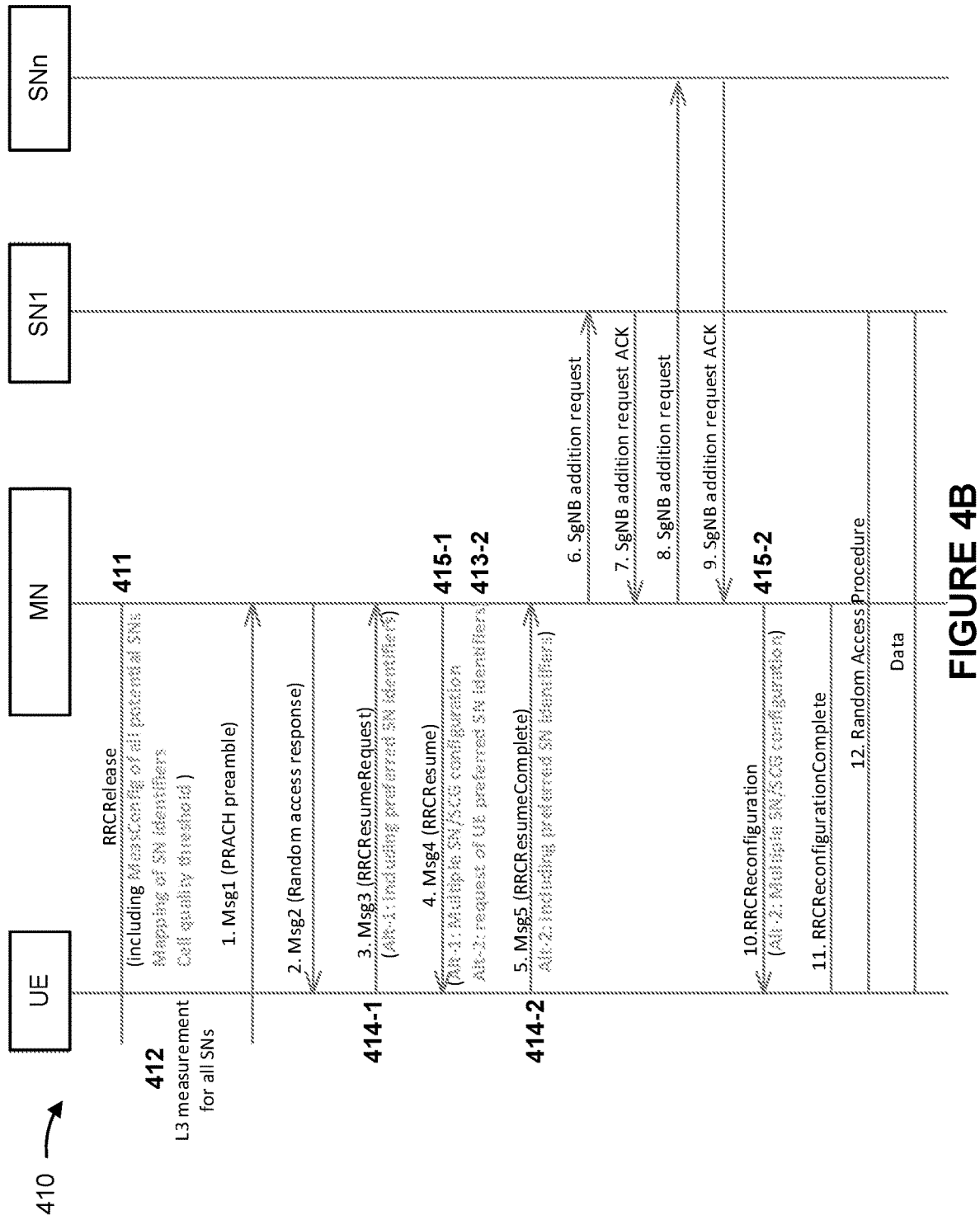

FIG. 4B is a diagram of an example 410 of a UE-based solution associated with early reporting for multi-SN when the UE is operating in an RRC inactive mode and uses a four-step RACH process to reestablish a connection with the MN.

As shown by reference number 411, the MN may provide (such as when the UE is entering the RRC inactive mode), and the UE may receive, an RRC release message that includes a measurement configuration associated with multiple SNs that are candidates to provide dual connectivity with the MN. As shown, in this example, the measurement configuration may include mapping information associating each of the multiple SNs with a respective SN identifier, and information that identifies a cell quality threshold.

As shown by reference number 412, the UE may perform measurements associated with the multiple SNs based at least in part on the measurement configuration received in the RRC release message. Here, the UE may identify a subset of the multiple SNs based at least in part on the measurements and the cell quality threshold, as described above.

In a first alternative, as shown by reference number 414-1, the UE may provide an RRC resume request message (such as Msg3) including measurement information associated with the subset of SNs. As shown, in this example, the measurement information may include a subset of SN identifiers corresponding to a subset of the multiple SNs. As shown by reference number 415-1, the MN may provide, and the UE may receive, a multi-SN configuration including a configuration for at least two SNs of the subset of SNs. As shown, in the first alternative, the multi-SN configuration is included in an RRC resume message (such as Msg4). Notably, in the first alternative, the UE automatically provides the measurement information (such as without a request from the MN).

In a second alternative, as shown by reference number 413-2, the UE may receive an RRC resume message (such as Msg4) provided by the MN. As shown, the RRC resume message may include a request for measurement information associated with the multiple SNs. As shown by reference number 414-2, based at least in part on the request, the UE may provide an RRC resume complete message (such as Msg5) including the measurement information. As shown, in this example, the measurement information may include a subset of SN identifiers corresponding to a subset of the multiple SNs. As shown by reference number 415-2, the MN may provide, and the UE may receive, a multi-SN configuration including a configuration for at least two SNs of the subset of SNs. As shown, in the second alternative, the multi-SN configuration is included in an RRC reconfiguration message provided after addition of the multiple SNs by the MN.

Figure 4C:
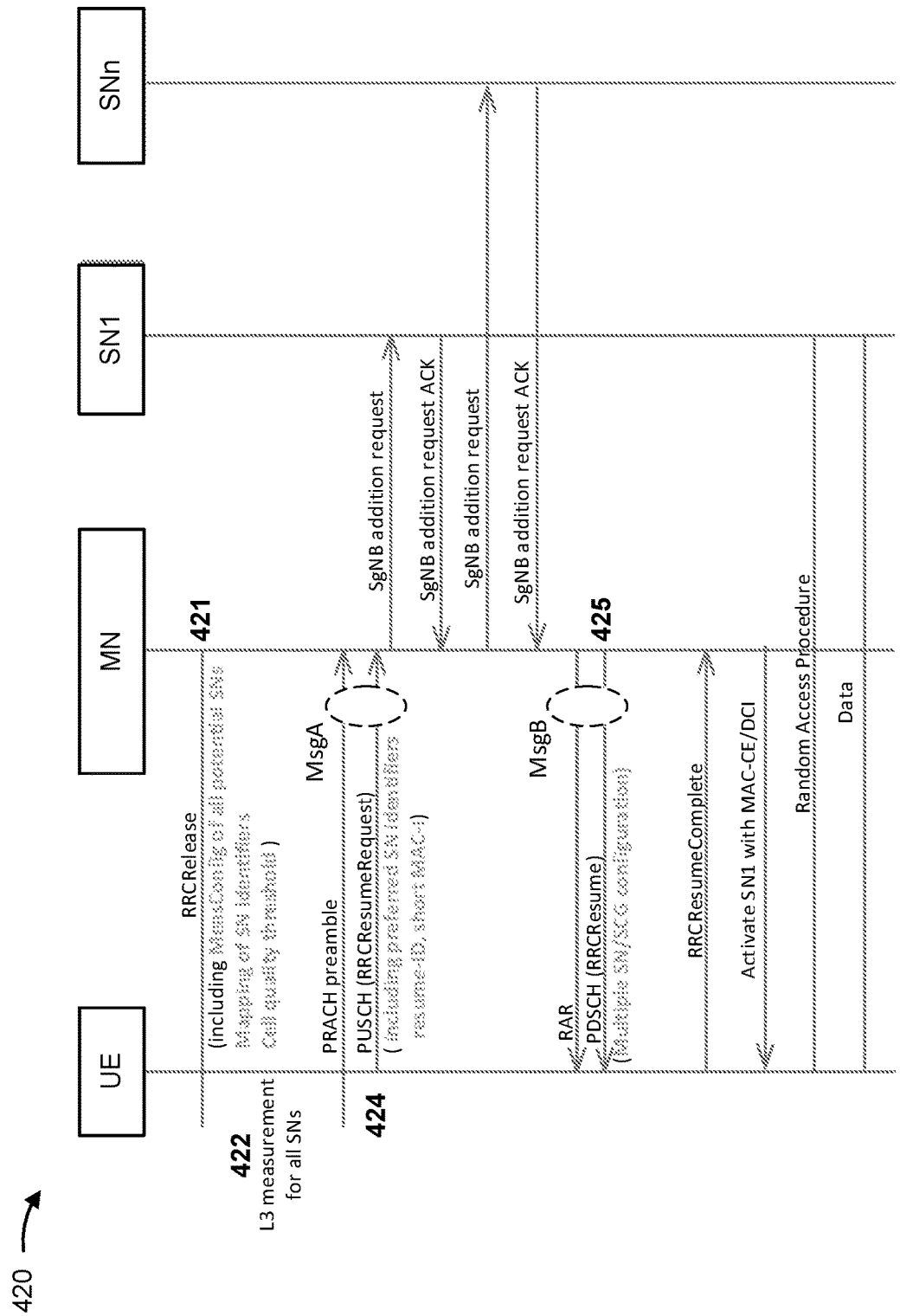

FIG. 4C is a diagram of an example 420 of a UE-based solution associated with early reporting for multi-SN when the UE is operating in an RRC inactive mode and uses a two-step RACH process to reestablish a connection with the MN.

As shown by reference number 421, the MN may provide (such as when the UE is entering the RRC inactive mode), and the UE may receive, an RRC release message that includes a measurement configuration associated with multiple SNs that are candidates to provide dual connectivity with the MN. As shown, in this example, the measurement configuration may include mapping information associating each of the multiple SNs with a respective SN identifier, and information that identifies a cell quality threshold.

As shown by reference number 422, the UE may perform measurements associated with the multiple SNs based at least in part on the measurement configuration received in the RRC release message. Here, the UE may identify a subset of the multiple SNs based at least in part on the measurements and the cell quality threshold, as described above.

As shown by reference number 424, the UE may provide an RRC resume request message (such as included in MsgA) including measurement information associated with the subset of SNs. As shown, in this example, the measurement information may include a subset of SN identifiers corresponding to a subset of the multiple SNs and one or more other information fields (such as a resume identifier, a short message authentication code-integrity (MAC-I).

As shown by reference number 425, the MN may provide, and the UE may receive, a multi-SN configuration including a configuration for at least two SNs of the subset of SNs. As shown, in this example, the multi-SN configuration is included in an RRC resume message (such as included in MsgB). Notably, in the example 420, the UE automatically provides the measurement information (such as without a request from the MN).

Figure 4D:
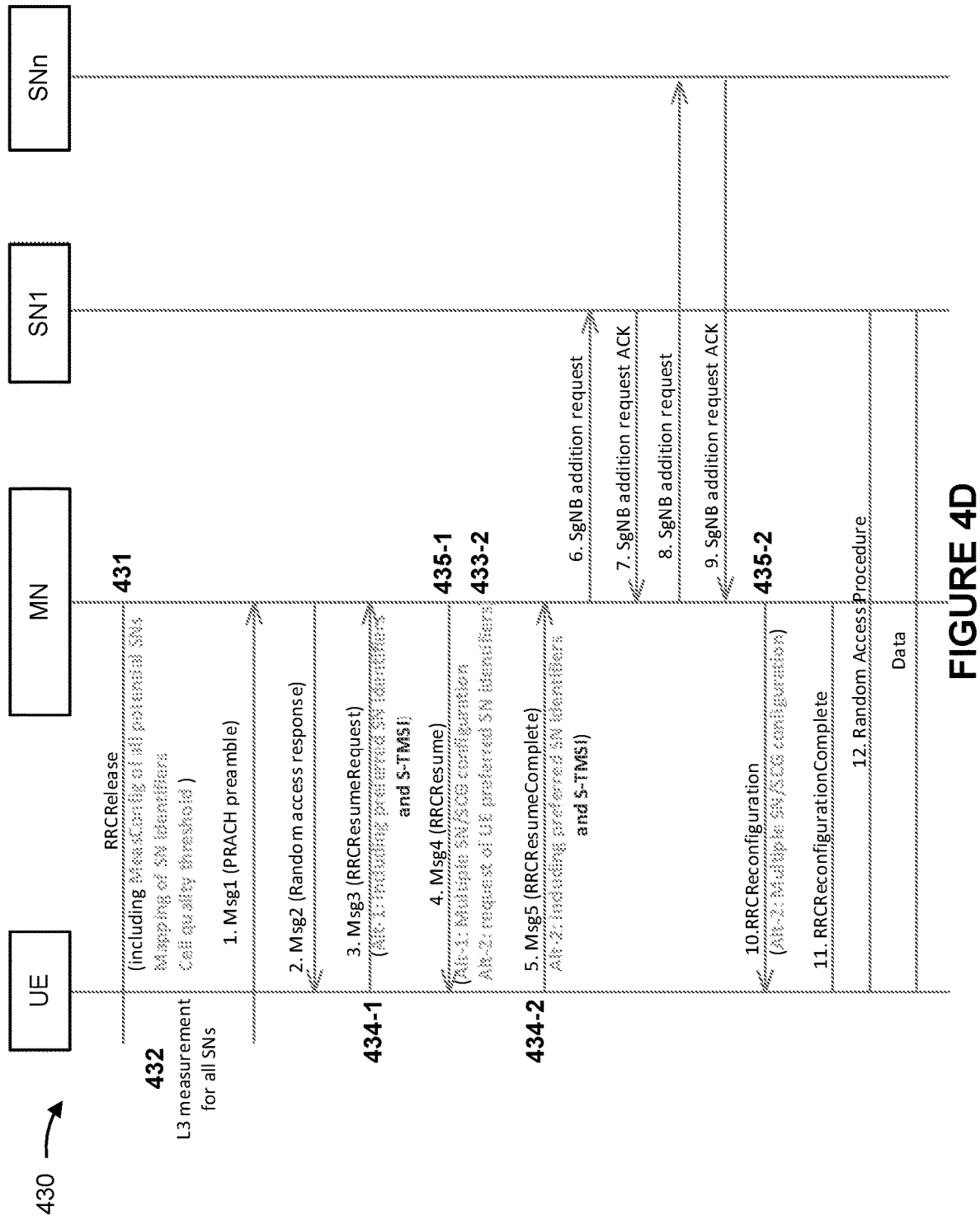

FIG. 4D is a diagram of an example 430 of a UE-based solution associated with early reporting for multi-SN when the UE is operating in an RRC idle mode and uses a four-step RACH process to reestablish a connection with the MN.

As shown by reference number 431, the MN may provide (such as when the UE is entering the RRC idle mode), and the UE may receive, an RRC release message that includes a measurement configuration associated with multiple SNs that are candidates to provide dual connectivity with the MN. As shown, in this example, the measurement configuration may include mapping information associating each of the multiple SNs with a respective SN identifier, and information that identifies a cell quality threshold.

As shown by reference number 432, the UE may perform measurements associated with the multiple SNs based at least in part on the measurement configuration received in the RRC release message. Here, the UE may identify a subset of the multiple SNs based at least in part on the measurements and the cell quality threshold, as described above.

In a first alternative, as shown by reference number 434-1, the UE may provide an RRC resume request message (such as Msg3) including measurement information associated with the subset of SNs. As shown, in this example, the measurement information may include a subset of SN identifiers corresponding to a subset of the multiple SNs and a TMSI associated with the UE (such as to enable the MN to determine previously configured information associated with the UE). As shown by reference number 435-1, the MN may provide, and the UE may receive, a multi-SN configuration including a configuration for at least two SNs of the subset of SNs. As shown, in the first alternative, the multi-SN configuration is included in an RRC resume message (such as Msg4). Notably, in the first alternative, the UE automatically provides the measurement information (such as without a request from the MN).

In a second alternative, as shown by reference number 433-2, the UE may receive an RRC resume message (such as Msg4) provided by the MN. As shown, the RRC resume message may include a request for measurement information associated with the multiple SNs. As shown by reference number 434-2, based at least in part on the request, the UE may provide an RRC resume complete message (such as Msg5) including the measurement information and the TMSI associated with the UE. As shown, in this example, the measurement information may include a subset of SN identifiers corresponding to a subset of the multiple SNs. As shown by reference number 435-2, the MN may provide, and the UE may receive, a multi-SN configuration including a configuration for at least two SNs of the subset of SNs. As shown, in the second alternative, the multi-SN configuration is included in an RRC reconfiguration message provided after addition of the multiple SNs by the MN.

Figure 4E:
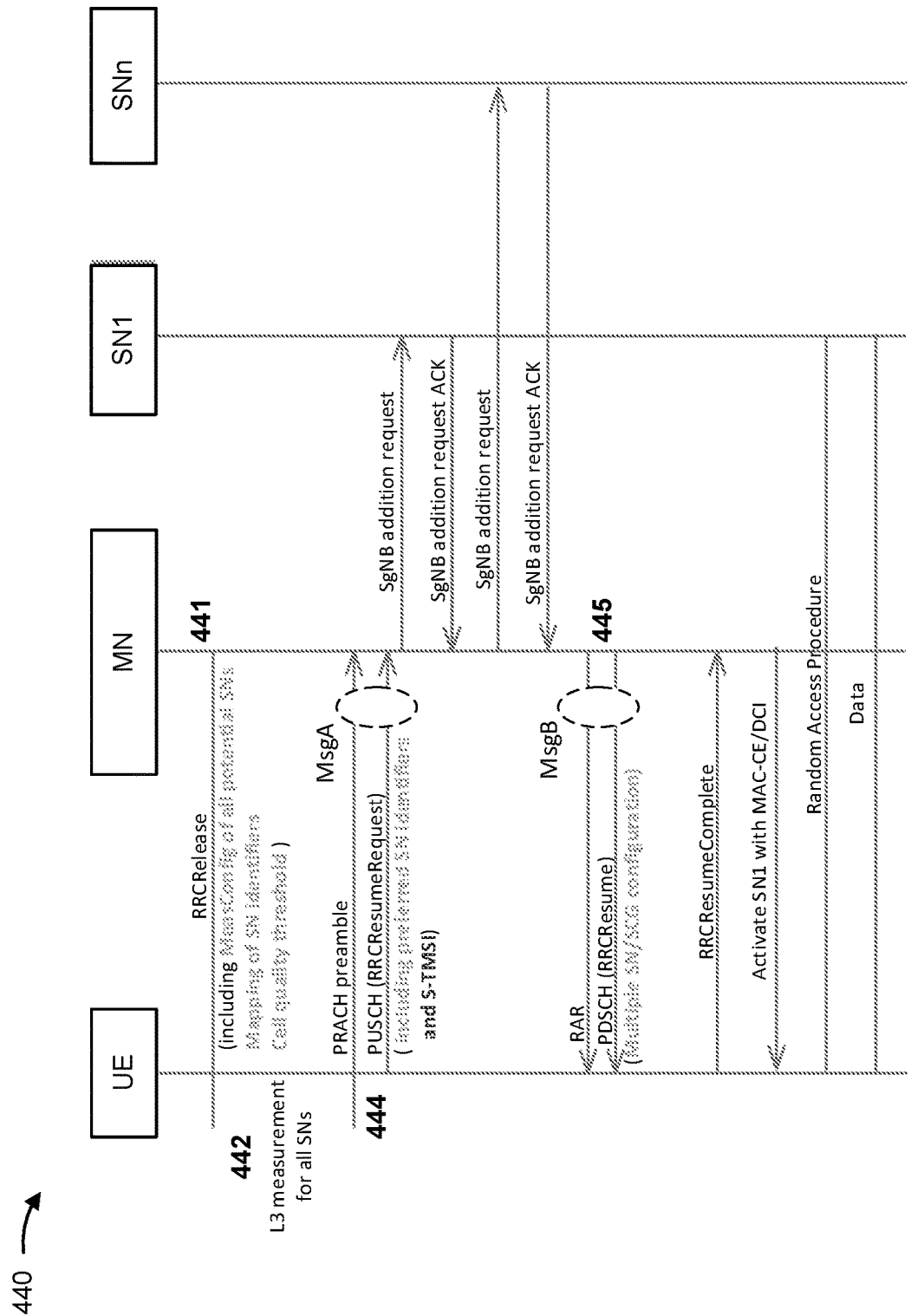

FIG. 4E is a diagram of an example 440 of a UE-based solution associated with early reporting for multi-SN when the UE is operating in an RRC idle mode and uses a two-step RACH process to reestablish a connection with the MN.

As shown by reference number 441, the MN may provide (such as when the UE is entering the RRC inactive mode), an RRC release message that includes a measurement configuration associated with multiple SNs that are candidates to provide dual connectivity with the MN. As shown, in this example, the measurement configuration may include mapping information associating each of the multiple SNs with a respective SN identifier, and information that identifies a cell quality threshold.

As shown by reference number 442, the UE may perform measurements associated with the multiple SNs based at least in part on the measurement configuration received in the RRC release message. Here, the UE may identify a subset of the multiple SNs based at least in part on the measurements and the cell quality threshold, as described above.

As shown by reference number 444, the UE may provide an RRC resume request message (such as included in MsgA) including measurement information associated with the subset of SNs and a TMSI associated with the UE. As shown, in this example, the measurement information may include a subset of SN identifiers corresponding to a subset of the multiple SNs.

As shown by reference number 445, the MN may provide, and the UE may receive, a multi-SN configuration including a configuration for at least two SNs of the subset of SNs. As shown, in this example, the multi-SN configuration is included in an RRC resume message (such as included in MsgB). Notably, in the example 440, the UE automatically provides the measurement information (such as without a request from the MN).

FIG. 5 is a diagram illustrating an example process 500 performed, for example, by a UE, in accordance with various aspects of the present disclosure. The example process 500 shows where a UE, such as the UE 120, performs operations associated with early measurement with multi-SN.

As shown in FIG. 5, in some aspects, the process 500 may include performing a plurality of measurements associated with a plurality of SNs that are candidates to provide dual connectivity with an MN (block 510). For example, the UE (such as using receive processor 258, transmit processor 264, controller/processor 280, memory 282) may perform a plurality of measurements associated with a plurality of SNs that are candidates to provide dual connectivity with an MN, as described above.

As shown in FIG. 5, in some aspects, the process 500 may include providing, to the MN, measurement information associated with a subset of SNs of the plurality of SNs, based at least in part on performing the plurality of measurements (block 520). For example, the UE (such as using transmit processor 264, controller/processor 280, memory 282) may provide, to the MN, measurement information associated with a subset of SNs of the plurality of SNs, based at least in part on performing the plurality of measurements, as described above.

Process 500 may include additional aspects, such as any single aspect or any combination of aspects described below or in connection with one or more other processes described elsewhere herein.

In a first aspect, the plurality of measurements is performed based at least in part on a measurement configuration associated with the plurality of SNs.

In a second aspect, alone or in combination with the first aspect, the measurement configuration includes mapping information associating each of the plurality of SNs with a respective SN identifier of a plurality of SN identifiers.

In a third aspect, alone or in combination with one or more of the first and second aspects, the measurement configuration includes information that identifies a cell quality threshold associated with selecting the subset of SNs from the plurality of SNs.

In a fourth aspect, alone or in combination with one or more of the first through third aspects, the measurement configuration is received in an RRC release message provided by the MN.

In a fifth aspect, alone or in combination with one or more of the first through fourth aspects, the UE may select the subset of SNs from the plurality of SNs based at least in part on a cell quality threshold.

In a sixth aspect, alone or in combination with one or more of the first through fifth aspects, the measurement information is provided based at least in part on a request received by the UE.

In a seventh aspect, alone or in combination with one or more of the first through sixth aspects, the request is received in an RRC resume message provided by the MN.

In an eighth aspect, alone or in combination with one or more of the first through seventh aspects, the measurement information is provided in an RRC resume complete message.

In a ninth aspect, alone or in combination with one or more of the first through eighth aspects, the measurement information is provided in an RRC resume request message.

In a tenth aspect, alone or in combination with one or more of the first through ninth aspects, the measurement information includes measurement reports associated with the subset of SNs.

In an eleventh aspect, alone or in combination with one or more of the first through tenth aspects, the measurement information includes a subset of SN identifiers, each identifying one SN in the subset of SNs.

In a twelfth aspect, alone or in combination with one or more of the first through eleventh aspects, the measurement information includes a TMSI associated with the UE in a RRC idle mode state.

In a thirteenth aspect, alone or in combination with one or more of the first through twelfth aspects, the UE may receive a multi-SN configuration after providing the measurement information. The multi-SN configuration may include a configuration for at least two SNs in the subset of SNs.

In a fourteenth aspect, alone or in combination with one or more of the first through thirteenth aspects, the multi-SN configuration is received in an RRC reconfiguration message.

In a fifteenth aspect, alone or in combination with one or more of the first through fourteenth aspects, the multi-SN configuration is received in an RRC resume message.

In a sixteenth aspect, alone or in combination with one or more of the first through fifteenth aspects, the UE is in an RRC idle mode.

In a seventeenth aspect, alone or in combination with one or more of the first through sixteenth aspects, the UE is in an RRC inactive mode.

In an eighteenth aspect, alone or in combination with one or more of the first through seventeenth aspects, the UE is performing a four-step RACH procedure.

In a nineteenth aspect, alone or in combination with one or more of the first through eighteenth aspects, the UE is performing a two-step RACH procedure.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a diagram illustrating an example process 600 performed, for example, by a MN, in accordance with various aspects of the present disclosure. The example process 600 shows where a MN, such as the base station 110, performs operations associated with early measurement with multi-SN.

As shown in FIG. 6, in some aspects, process 600 may include receiving, from a UE, measurement information associated with a subset of SNs of a plurality of SNs that are candidates to provide dual connectivity with the MN (block 610). For example, the base station (such as using receive processor 238, controller/processor 240, memory 242) may receive, from a UE, such as the UE 120, measurement information associated with a SNs of a plurality of SNs that are candidates to provide dual connectivity with the MN, as described above.

As further shown in FIG. 6, in some aspects, process 600 may include providing a multi-SN configuration based at least in part on the measurement information, where the multi-SN configuration includes a configuration for at least two SNs in the subset of SNs (block 620). For example, the base station (such as using transmit processor 220, controller/processor 240, memory 242) may provide a multi-SN configuration based at least in part on the measurement information, where the multi-SN configuration includes a configuration for at least two SNs in the subset of SNs, as described above.

Process 600 may include additional aspects, such as any single aspect or any combination of aspects described below or in connection with one or more other processes described elsewhere herein.

In a first aspect, the MN may provide a measurement configuration associated with the plurality of SNs.

In a second aspect, alone or in combination with the first aspect, the measurement configuration includes mapping information associating each of the plurality of SNs with a respective SN identifier of a plurality of SN identifiers.

In a third aspect, alone or in combination with one or more of the first and second aspects, the measurement configuration includes information that identifies a cell quality threshold associated with selecting the subset of SNs from the plurality of SNs.

In a fourth aspect, alone or in combination with one or more of the first through third aspects, the measurement configuration is provided in an RRC release message provided by the MN.

In a fifth aspect, alone or in combination with one or more of the first through fourth aspects, the measurement information is received based at least in part on a request provided by the MN.

In a sixth aspect, alone or in combination with one or more of the first through fifth aspects, the request is provided in an RRC resume message to the UE.

In a seventh aspect, alone or in combination with one or more of the first through sixth aspects, the measurement information is received in an RRC resume complete message.

In an eighth aspect, alone or in combination with one or more of the first through seventh aspects, the measurement information is received in an RRC resume request message.

In a ninth aspect, alone or in combination with one or more of the first through eighth aspects, the measurement information includes measurement reports associated with the subset of SNs.

In a tenth aspect, alone or in combination with one or more of the first through ninth aspects, the measurement information includes a subset of SN identifiers, each identifying one SN in the subset of SNs.

In an eleventh aspect, alone or in combination with one or more of the first through tenth aspects, the measurement information includes a TMSI associated with the UE in an RRC idle mode state.

In a twelfth aspect, alone or in combination with one or more of the first through eleventh aspects, the multi-SN configuration is provided in an RRC reconfiguration message.

In a thirteenth aspect, alone or in combination with one or more of the first through twelfth aspects, the multi-SN configuration is provided in an RRC resume message.

In a fourteenth aspect, alone or in combination with one or more of the first through thirteenth aspects, the UE is in an RRC idle mode.

In a fifteenth aspect, alone or in combination with one or more of the first through fourteenth aspects, the UE is in an RRC inactive mode.

In a sixteenth aspect, alone or in combination with one or more of the first through fifteenth aspects, the UE is performing a four-step RACH procedure.

In a seventeenth aspect, alone or in combination with one or more of the first through sixteenth aspects, the UE is performing a two-step RACH procedure.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, or not equal to the threshold.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by a user equipment (UE), comprising:
   receiving a measurement configuration including mapping information corresponding to a plurality of secondary nodes (SNs) that are candidates to provide dual connectivity with a master node (MN);
   performing a plurality of measurements associated with the plurality of SNs;
   selecting a subset of SNs from the plurality of SNs based at least in part on at least one measurement of the plurality of measurements satisfying a cell quality threshold; and
   providing, to the MN, measurement information associated with the subset of SNs, based at least in part on performing the plurality of measurements, the measurement information including a temporary mobile subscriber identity (TMSI) associated with the UE and corresponding to the mapping information.

2. The method of claim 1, wherein the mapping information associates each of the plurality of SNs with a respective SN identifier of a plurality of SN identifiers.

3. The method of claim 1, wherein the measurement configuration includes information that identifies the cell quality threshold.

4. The method of claim 1, wherein the measurement configuration is received in a radio resource control (RRC) release message provided by the MN in connection with the UE entering an RRC inactive mode or an RRC idle mode.

5. The method of claim 1, wherein the measurement information is provided based at least in part on a request received by the UE.

6. The method of claim 5, wherein the request is received in a radio resource control (RRC) resume message provided by the MN.

7. The method of claim 1, wherein the measurement information is provided in a radio resource control (RRC) resume complete message.

8. The method of claim 1, wherein the measurement information is provided in a radio resource control (RRC) resume request message.

9. The method of claim 1, wherein the measurement information includes measurement reports associated with the subset of SNs.

10. The method of claim 1, wherein the measurement information includes a subset of SN identifiers, each identifying one SN in the subset of SNs.

11. The method of claim 1, wherein the TMSI is associated with the UE in a radio resource control (RRC) idle mode state.

12. The method of claim 1, further comprising:
   receiving a multi-SN configuration after providing the measurement information,
      wherein the multi-SN configuration includes a configuration for at least two SNs in the subset of SNs.

13. The method of claim 12, wherein the multi-SN configuration is received in a radio resource control (RRC) reconfiguration message.

14. The method of claim 12, wherein the multi-SN configuration is received in a radio resource control (RRC) resume message.

15. The method of claim 1, wherein the UE is in a radio resource control (RRC) idle mode.

16. The method of claim 1, wherein the UE is in a radio resource control (RRC) inactive mode.

17. The method of claim 1, wherein the UE is performing a four-step random access (RACH) procedure.

18. The method of claim 1, wherein the UE is performing a two-step random access (RACH) procedure.

19. A method of wireless communication performed by a master node (MN), comprising:
   providing a measurement configuration including mapping information corresponding to a plurality of secondary nodes (SNs) that are candidates to provide dual connectivity with the MN;
   receiving, from a user equipment (UE), measurement information associated with a subset of SNs of the plurality of SNs, the measurement information including a temporary mobile subscriber identity (TMSI) associated with the UE and corresponding to the mapping information, the measurement information associated with each SN of the subset of SNs satisfying a cell quality threshold; and
   providing a multi-SN configuration based at least in part on the measurement information,
      wherein the multi-SN configuration includes a configuration for at least two SNs in the subset of SNs.

20. The method of claim 19, wherein the measurement information is received based at least in part on a request provided by the MN.

21. The method of claim 19, wherein the measurement information is received in a radio resource control (RRC) resume complete message.

22. The method of claim 19, wherein the measurement information is received in a radio resource control (RRC) resume request message.

23. The method of claim 19, wherein the measurement information includes measurement reports associated with the subset of SNs.

24. The method of claim 19, wherein the measurement information includes a subset of SN identifiers, each identifying one SN in the subset of SNs.

25. The method of claim 19, wherein the measurement information corresponds to the UE in a radio resource control (RRC) idle mode state.

26. The method of claim 19, wherein the measurement configuration is provided in connection with the UE entering a radio resource control (RRC) inactive mode or RRC idle mode.

27. A user equipment (UE) for wireless communication, comprising:
   one or more memories; and
   one or more processors coupled to the one or more memories, the one or more processors, individually or in any combination, configured to:
      receive a measurement configuration including mapping information corresponding to a plurality of secondary nodes (SNs) that are candidates to provide dual connectivity with a master node (MN);
      perform a plurality of measurements associated with the plurality SNs;

select a subset of SNs from the plurality of SNs based at least in part on at least one measurement of the plurality of measurements satisfying a cell quality threshold; and provide, to the MN, measurement information associated with the subset of SNs, based at least in part on performing the plurality of measurements, the measurement information including a temporary mobile subscriber identity (TMSI) associated with the UE and corresponding to the mapping information.

28. A master node (MN) for wireless communication, comprising:

one or more memories; and one or more processors coupled to the one or more memories, the one or more processors, individually or in any combination, configured to:

provide a measurement configuration including mapping information corresponding to a plurality of secondary nodes (SNs) that are candidates to provide dual connectivity with the MN;

receive, from a user equipment (UE), measurement information associated with a subset of SNs of the plurality of SNs, the measurement information including a temporary mobile subscriber identity (TMSI) associated with the UE and corresponding to the mapping information, the measurement information associated with each SN of the subset of SNs satisfying a cell quality threshold; and provide a multi-SN configuration based at least in part on the measurement information, wherein the multi-SN configuration includes a configuration for at least two SNs in the subset of SNs.

29. The MN of claim 28, wherein the measurement the measurement configuration is provided in radio resource control (RRC) release message in connection with the UE entering an RRC inactive mode or an RRC idle mode.

* * * * *